July 15, 1958 E. E. ST. JOHN 2,843,757
AUTOMATIC GAIN CONTROL CIRCUIT FOR USE WITH PHOTOCONDUCTIVE DEVICES
Filed Aug. 25, 1955
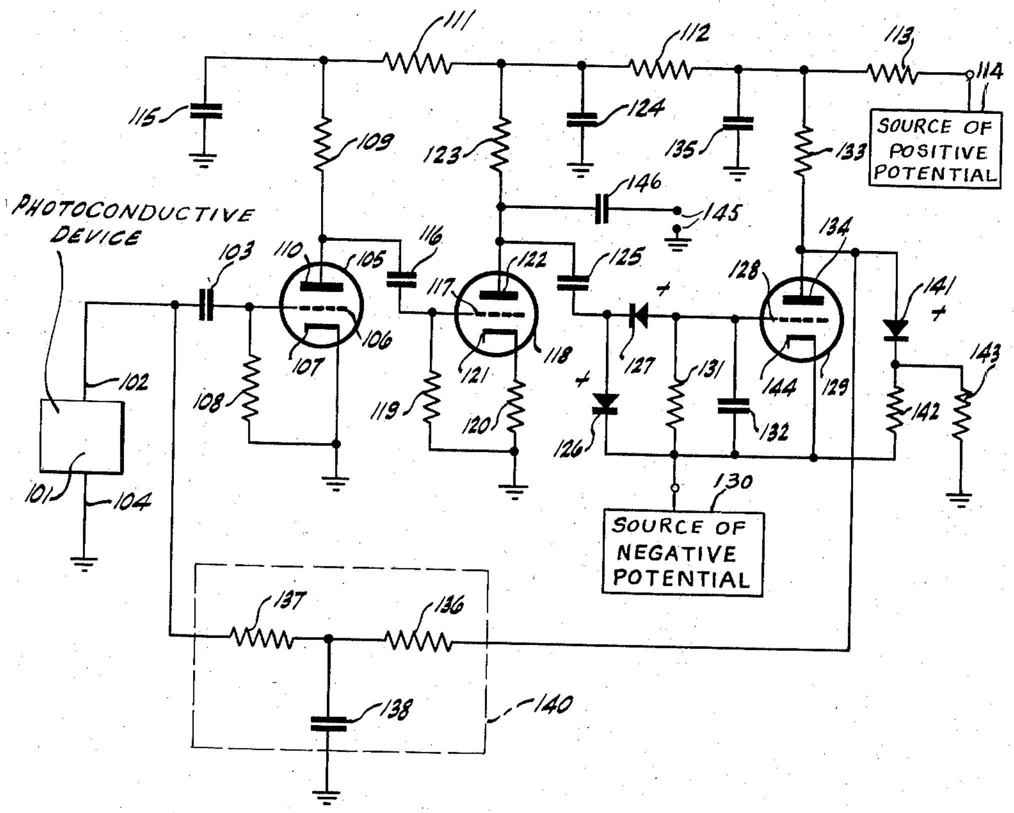
INVENTOR.
ERCELL E. ST JOHN,
BY
Henry Heyman
ATTORNEY.

2,843,757
Patented July 15, 1958

2,843,757

AUTOMATIC GAIN CONTROL CIRCUIT FOR USE WITH PHOTOCONDUCTIVE DEVICES

Ercell E. St. John, Hawthorne, Calif., assignor to Hughes Aircraft Company, Culver City, Calif., a corporation of Delaware Application August 25, 1955, Serial No. 530,534
5 Claims. (Cl. 250—214)

This invention relates to automatic gain control systems and in particular to a novel means for controlling the gain of photoelectric device systems and the like.

The photoelectric effect is employed in many fields. In sound motion pictures, photocell pickup devices are used in conjunction with audio amplifiers. In radiation detection for both visible and invisible radiations various applications of the photoelectric effect are made. The photoelectric devices are usually followed by amplifying circuits.

Should the radiation or other energy being detected by the photoelectric devices be excessive or should the range of variations be excessive, it is possible to provide automatic circuits responsive to the amplitude of variation to vary the gain of the amplifier circuits to correct for the excessive variations. This automatic gain control (A. G. C.) technique, however, does not vary the sensitivity of the photoelectric device employed in the circuit. The photoelectric device may thus be overloaded.

In the present invention means for controlling the gain of photoelectric circuits has been devised which varies the sensitivity of the photoelectric device in response to excessive variations in radiation intensity impinging upon the photoelectrc device.

Accordingly, it is an object of this invention to provide a novel A. G. C. circuit for photoelectric detection systems.

It is a further object of this invention to provide an A. G. C. system whereby the sensitivity of the photoelectric detecting device is reduced when the radiation variations impinging thereon are excessive.

It is still another object of this invention to provide a means for controlling the gain of a photoelectric circuit by rectifying the alternating signal derived from the radiation applied to a photoelectric or photoconductive device so as to bias a control tube in the excitation voltage circuit for the photoelectric device thereby to control the sensitivity of the photoelectric device.

It is yet another object of this invention to provide a control circuit for the excitation voltage of a photoelectric radiation detector whereby the sensitivity of the detector is varied inversely as the amplitude of the variations of the radiation impinging thereon.

The novel features which are believed to be characteristic of this invention, both as to its organization and method of operation, together with further objects and advantages thereof, will be better understood from the following description considered together with the accompanying drawing in which an embodiment of the invention is illustrated by way of example. It is to be expressly understood, however, that the drawing is for the purpose of illustration and description only, and is not intended as a definition of the limits of the invention.

Fig. 1 is a circuit diagram of a sensitivity control circuit for a photoelectric or photoconductive device according to this invention.

In Fig. 1 to which reference is now made a photoelectric or photoconductive device 101 is shown followed by a coupling capacitor 103 coupling the photoelectric device terminal 102 to the grid 106 of a first amplifier triode 105. The terminal 104 of photoelectric device 101 is connected to ground. The cathode 107 of amplifier 105 is connected to ground. A grid leak resistor 108 is connected between grid 106 and ground. An anode load resistor 109 is connected between anode 110 of triode 105 and a source of B+ potential at 114 through a series of dropping resistors 111, 112 and 113. A capacitor 115 is a decoupling filter connected at the junction of load resistor 109 with filter resistor 111. A coupling capacitor 116 is connected between anode 110 and the grid 117 of a second amplifier triode 118. A cathode bias resistor 120 is connected between cathode 121 of triode 118 and ground. A grid leak resistor 119 is connected between grid 117 and ground. An anode load resistor 123 is connected between anode 122 of triode 118 and the junction of dropping resistors 111 and 112. A decoupling filter capacitor 124 is connected from the junction of resistors 111, 112 and 123 to ground. An output coupling capacitor 146 is connected between anode 122 of triode 118 and output terminals 145. A coupling capacitor 125 has one of its terminals connected to anode 122 of triode 118. The other terminal of capacitor 125 is connected to the junction of two diodes 126 and 127. Diode 126 is connected between the above-mentioned junction and a source of negative potential 130 and is poled to conduct negative going signals. Diode 127 is connected between the above-mentioned junction and the grid 128 of a triode 129 and is poled to conduct positive going signals to the grid 128. A grid leak resistor 131 is connected between the grid 128 and negative potential source 130. A capacitor 132 is connected in parallel with resistor 131. An anode load resistor 133 is connected between anode 134 of triode 129 and the junction of resistors 112 and 113. A decoupling filter capacitor 135 is connected from the junction of resistors 112, 113 and 133 to ground. A filter network 140 comprises resistors 136 and 137 connected in series and capacitor 138 connected from the junction of resistors 136 and 137 to ground. Filter network 140 is connected between anode 134 of triode 129 and terminal 102 of photoelectric device 101. A diode 141, poled to conduct positive going signals is connected between anode 134 and the junction of resistors 142 and 143. Resistors 142 and 143 comprise a voltage divider connected between ground and negative potential source 130.

The operation of the circuit of this invention may be best described as follows, with reference to Fig. 1.

Radiation of varying amplitude, impinging upon photoelectric device 101 results in a change in its resistance corresponding to the radiation variations. Photoelectric device 101 may be any radiation detecting device which operates on the photoelectric principle such as an ionization chamber or gas filled photocell, or photoconductive cell, or the like. A negative potential with respect to ground is applied to terminal 102 of photoelectric or photoconductive device 101 through resistor 113, 133 and control amplifier 129 connected between a source of positive potential 114 and a source of negative potential 130. Control amplifier 129 is normally biased so that its anode 134 is negative with respect to ground. The chain comprising resistors 113, 133, network 140 and photoelectric device 101 may be considered a divider network between source of positive potential 114 and ground. Under normal operating conditions as noted above the junction point of anode 134 and network 140 is at a negative potential with respect to ground. The excitation potential at terminal 102 of photoelectric device 101 is therefore negative with respect to ground. Photoelectric device 101 is in effect a variable resistor which changes with the intensity of radiation impinging thereon. The rate of change of the variation will result in an alternating variation in the voltage at the junction of photoelectric device 101 with capacitor 103. The variations constitute an A.-C. signal coupled across capacitor 103 to the grid 106 of first amplifier stage 105. The amplified signal developed at anode 110 of amplifier 105 is coupled through capacitor 116 to the grid of 117 second amplifier stage 118. The signal is further amplified by stage 118 and the resultant amplified signal at the anode 122 of stage 118 is coupled through capacitor 146 to output terminals 145 and through capacitor 125 to the rectifier network 126, 127 in the grid circuit 128 of control amplifier stage 129. Rectifier 126 is poled so as to conduct only negative going signals. Positive going signals are conducted to the grid of the control amplifier 129 by diode 127. The negative going signals charge capacitor 132 so that grid 128 will be more negative with respect to cathode 144 of control amplifier 129. The greater the amplitude of the A.-C. signal appearing at anode 122 of amplifier 118, the greater the negative potential appearing across capacitor 132. Control amplifier 129 in the face of the negative bias thus developed in its grid circuit conducts less strongly. This results in a reduced anode current for control amplifier 129 and a correspondingly lower voltage drop across resistor 133 in the anode circuit of amplifier 129 making anode 134 less negative. The negative excitation potential with respect to ground at the terminal 102 of photoelectric device 101 thus becomes less negative. The A.-C. signal developed at the photoelectric device junction of capacitor 103 with terminal 102 is reduced as a result of the decreased sensitivity of the photoelectric device 101. The decrease in sensitivity of photoelectric device 101 is due to the fact that the excitation potential on terminal 102 thereof is at a less negative potential with respect to ground in the presence of a strong A.-C. signal applied to the amplifier stages 105 and 118 than when a signal of lower amplitude appears at the input of amplifier 105. The output signal amplitude appearing at output terminals 145 is thereby maintained at a constant level despite variations in the radiation intensity impinging upon the photoelectric or photoconductive device 101.

What is claimed as new is:

1. A circuit for controlling the conductivity of a photoelectric device to maintain a constant output signal in the face of amplitude variations in the incident radiation impinging thereon, said circuit comprising: a photoelectric detecting device responsive to the radiation for developing a characteristic signal; an amplifier having an input circuit and an output circuit, said input circuit of said amplifier being connected to said photoelectric device for amplifying said characteristic signal and developing an output signal in said output circuit; a rectifier connected to said output circuit of said amplifier for developing a D.-C. bias voltage corresponding in amplitude to the amplitude of said output signal; a source of positive potential with respect to a ground point; a source of negative potential with respect to said ground point; and a control amplifier having an input circuit connected to said rectifier and interconnected between said positive and negative sources of potential, said control amplifier having an output circuit connected to said photoelectric device so as to maintain said photoelectric device at a negative potential with respect to said ground point, said control amplifier being responsive to said D.-C. bias voltage to provide a less negative potential to said photoelectric device as said bias voltage increases, whereby the conductivity of said photoelectric device is reduced and said output signal in said output circuit of said amplifier is maintained at a constant level independently of the amplitude variations of said radiation.

2. A circuit for controlling the sensitivity of a photoconductive device to maintain a constant output signal while the intensity of the incident radiation impinging thereon varies, said circuit comprising: a photoconductive detecting device responsive to the radiation impinging thereon for developing a characteristic signal; an amplifier having an input circuit connected to said photoconductive device and having an output circuit for said signal generating means connected to said output circuit of said amplifier for developing a control voltage in response to said signal, said control voltage corresponding in amplitude to the intensity of said radiation; a controlled source of negative potential with respect to a ground point, said controlled source of negative potential being coupled to said generating means and connected to said photoconductive device for applying said negative potential thereto, said controlled source of negative potential being responsive to said control voltage to change the negative potential with respect to said ground point applied to said photoconductive device and to vary said negative potential inversely as said control voltage varies in response to the intensity variations of said radiation whereby the sensitivity of said photoconductive device is varied to maintain a uniform signal amplitude in said output circuit.

3. A circuit for controlling the sensitivity of a photoelectric device to maintain a constant output signal while the intensity of the incident radiation impinging thereon varies, said circuit comprising: a photoelectric detecting means for varying its conductivity as the excitation potential applied thereto varies and being responsive to the radiation for developing a signal; an excitation potential means connected to said photoelectric detecting means for being varied by a control voltage; and control means connected to said excitation potential means and connected to said photoelectric detecting means, said control means being responsive to said signal to develop a control voltage, said control voltage being applied to said excitation potential means to change said excitation potential applied to said photoelectric detecting means inversely as the intensity of the radiation impinging thereon varies to adjust the conductivity of said photoelectric detecting means to maintain a constant output signal from said photoelectric detecting means.

4. An automatic gain control system for photoelectric circuits comprising a photoconductive device; an amplifier having an input circuit and an output circuit, said input circuit being connected to said photoconductive device, a rectifier connected to the output circuit of said amplifier; and a control means connected between said rectifier means and said photoconductive device, said photoconductive device being responsive to sources of radiation for developing a signal in response to the radiation therefrom impinging on said photoconductive device, said signal being amplified by said amplifier and rectified by said rectifier, the rectified signal being applied to said control means, said control means being responsive to the amplitude of said rectifier signal to control the conductivity of said photoconductive device in an inverse ratio to the intensity of said radiation.

5. The method of maintaining a constant output amplitude of the signal in a photoelectric amplifying system comprising the steps of: causing radiation to impinge upon a photoconductive device, applying an excitation potential to the photoconductive device; generating a signal which varies as the intensity of the radiation impinging upon the photoconductive device; amplifying the varying signal; applying said signal to an output device; rectifying said signal to develop therefrom a bias signal; controlling an excitation potential control amplifier with said bias signal to inversely vary the excitation potential applied to the photoconductive device, whereby when said radiation impinging upon said photoconductive device varies in intensity, the excitation potential is varied inversely as the radiation intensity to control the conductivity of said photoconductive device, thereby to maintain a constant output signal in the output device.

References Cited in the file of this patent

UNITED STATES PATENTS

| | | |
|---|---|---|
| 2,469,852 | Strutt et al. | May 10, 1949 |
| 2,517,554 | Frommer | Aug. 8, 1950 |